United States Patent
Obermüller et al.

(10) Patent No.: US 11,059,515 B2
(45) Date of Patent: Jul. 13, 2021

(54) METHOD FOR CONTROL OF A REAR-AXLE STEERING OF A MOTOR VEHICLE

(71) Applicant: AUDI AG, Ingolstadt (DE)

(72) Inventors: Anton Obermüller, Ingolstadt (DE); Adrian Mihailescu, Ingolstadt (DE); Ferdinand Hartinger, Müchen (DE); Klaus Diepold, Kissing (DE); Martin Enning, Ingolstadt (DE); Christian Wiedenmann, Ingolstadt (DE); Michael Ortlechner, Ingolstadt (DE); Matthias Lehmann, Freising (DE)

(73) Assignee: AUDI AG, Ingolstadt (DE)

(*) Notice: Subject to any disclaimer, the term of this patent is extended or adjusted under 35 U.S.C. 154(b) by 108 days.

(21) Appl. No.: 16/183,046

(22) Filed: Nov. 7, 2018

(65) Prior Publication Data
US 2019/0135337 A1    May 9, 2019

(30) Foreign Application Priority Data
Nov. 8, 2017   (DE) .......................... 102017219881.8

(51) Int. Cl.
| | | |
|---|---|---|
| *B62D 6/00* | (2006.01) | |
| *B60W 30/045* | (2012.01) | |
| *B62D 7/15* | (2006.01) | |

(52) U.S. Cl.
CPC .......... *B62D 6/006* (2013.01); *B60W 30/045* (2013.01); *B62D 6/003* (2013.01); *B62D 7/159* (2013.01)

(58) Field of Classification Search
CPC ........ B62D 6/006; B62D 6/003; B62D 7/159; B60W 30/045; B60W 10/184; B60W 40/064; B60W 2510/20; B60T 2230/02; B60T 2260/022
See application file for complete search history.

(56) References Cited

U.S. PATENT DOCUMENTS

| | | | |
|---|---|---|---|
| 5,386,365 A | 1/1995 | Nagaoka | |
| 2006/0025896 A1* | 2/2006 | Traechtler | .......... B60T 8/17552 |
| | | | 701/1 |
| 2008/0109133 A1 | 5/2008 | Bedner et al. | |

(Continued)

FOREIGN PATENT DOCUMENTS

| | | |
|---|---|---|
| DE | 3807100 A1 | 9/1989 |
| DE | 69206310 T2 | 6/1996 |
| DE | 102010036619 A1 | 1/2012 |

(Continued)

OTHER PUBLICATIONS

Office Action dated Nov. 11, 2019, in corresponding Korean Application No. 10-2018-0135802; 9 pages.

(Continued)

*Primary Examiner* — Anne Marie Antonucci
*Assistant Examiner* — Andrew J Cromer
(74) *Attorney, Agent, or Firm* — Maier & Maier, PLLC

(57) ABSTRACT

A method for control of a rear-axle steering of a motor vehicle. A steering angle of wheels of a rear axle is set. Upon reaching a predetermined lateral acceleration of the motor vehicle, the steering angle and/or the gradient of the steering angle of the wheels of the rear axle is limited as a function of a coefficient of friction of a roadway surface on which the motor vehicle is moving.

3 Claims, 2 Drawing Sheets

(56) References Cited

U.S. PATENT DOCUMENTS

2009/0319128 A1* 12/2009 Lauer .................. B60W 50/16
                                                  701/42
2010/0228444 A1   9/2010 Kojo et al.

FOREIGN PATENT DOCUMENTS

| DE | 102011016633 A1 | 10/2012 |
| EP | 0510365 A2 | 10/1992 |
| JP | H04-126668 A | 4/1992 |

OTHER PUBLICATIONS

The extended European search report dated Apr. 8, 2019 in corresponding European patent application No. 18201015.7; including partial machine-generated English language translation; 9 pages.
Search Report dated Jul. 5, 2018 in corresponding German Application No. 102017219881.8; 10 pgs.

* cited by examiner

METHOD FOR CONTROL OF A REAR-AXLE STEERING OF A MOTOR VEHICLE

FIELD

The invention relates to a method for control of a rear-axle steering of a motor vehicle, wherein a steering angle of wheels of the rear axle is set, as well as a device for carrying out the method.

BACKGROUND

For safety reasons, the current mass-produced vehicles are basically designed with understeering. When moving along a curve in the lateral dynamic limit range, the cornering angle at the rear axle is less than the cornering angle at the front axle, which prevents an uncontrolled oversteering of the vehicle and makes it manageable for the driver.

Motor vehicles with a rear-wheel or rear-axle steering may greatly influence the dynamic ratio of the cornering angle between the front axle and the rear axle. In the event of a steering movement of the rear axle proportionally opposite in direction to the front axle, the driving behavior is altered in the direction of oversteering. In the case of a steering movement in the same direction, on the other hand, the driving behavior is shifted toward understeering.

When steering, and especially oversteering, occurs in the lateral dynamic limit range, the front axle is the first to reach the cornering angle with the maximum lateral force. Accordingly, an increasing of the steering angle, i.e., an oversteering, results in a decreasing of the lateral force of the front axle. However, at this time the cornering angle has not yet reached the maximum lateral force at the rear axle, so that a steering movement of the rear axle in the same direction results in an increasing of the lateral force on the rear axle. Thus, the rear-axle steering adds an additional lateral force to the lateral force which is present. In this way, the driving behavior will be directed toward strong understeering, and in the extreme case may result in straight motion and hence driving off the roadway.

Similarly, an excessive steering movement of the rear-axle steering in the opposite direction in the limit range results in a reduction of the lateral forces on the rear axle. The driving behavior in this way will be directed toward strong oversteering, and in the extreme case may result in extreme oversteering of the motor vehicle and loss of control.

The maximum possible cornering angles are dependent on the roadway coefficient of friction, i.e., the adhesion potential of the roadway. On slippery ground, such as a snow-covered or an ice-covered road, the maximum cornering angle is reached much more quickly than on dry asphalt.

DE 10 2010 036 619 A1 describes a method for operating a steering system in a motor vehicle having a rear-axle steering. Here, a cornering angle of the front axle is influenced by steering of the rear axle in such a way that it remains constant over a steering-wheel angle range.

US 2008/0109133 A1 describes a method for limiting the tire slip angle in a steering control system for a motor vehicle, in which a first steering angle magnification is calculated from a vehicle speed and a steering wheel angle. Furthermore, an upper critical angle limit and a lower critical angle limit are calculated as functions of a vehicle slip angle and a tire slip angle limit. The sum of the steering wheel angle and the first steering angle magnification between the upper critical angle limit and the lower critical angle limit is calculated in order to generate a first limited angle. Furthermore, the sum of the manual steering wheel angle and the first steering angle magnification is subtracted from the first limiting angle in order to generate a first limiting function, and an engine angle command is generated by adding the first limiting function and the first steering angle magnification.

SUMMARY

The object of the present invention is to create a method for the control of a rear-axle steering of a motor vehicle, with which driving safety can be enhanced.

According to the present invention, upon reaching a predetermined lateral acceleration of the motor vehicle, the steering angle and/or the gradient of the steering angle of the wheels of the rear axle is thus limited as a function of a coefficient of friction of a roadway surface. In other words, the piloted steering movement of the rear axle in the lateral dynamic limit range is limited as a function of the roadway coefficient of friction and the coefficient of friction utilization to maximum permissible angles or angle gradients. Such a coefficient of friction-adaptive limiting of the piloted rear-axle steering angle or angle gradient and thus a limiting of the steering movement of the rear axle in the range of the maximum cornering angle of the same prevents unwanted steering movements and thus the occurrence of understeering or oversteering, and hence results in a significantly improved driving safety.

If, in a very advantageous enhancement of the invention, the steering angle and/or the gradient of the steering angle is limited in the case of falling below a given coefficient of friction of the roadway surface, this makes provision for the circumstance that the described problems occur in fact when driving on roadway surfaces with a low coefficient of friction.

Furthermore, it may be provided that the steering angle of the wheels of the rear axle is set by means of a steering angle setting device, which ensures a very simple implementing of the method.

An especially harmonic motion can be achieved if the gradient of the steering angle is reduced continuously.

Enhanced driving safety of the motor vehicle is achieved if the limiting of the steering angle and/or the gradient of the steering angle of the wheels of the rear axle is carried out as a function of a driving speed of the motor vehicle.

With such a device, the method according to the invention can be implemented in very simple manner.

BRIEF DESCRIPTION OF THE DRAWINGS

Further advantages, features and details of the invention will emerge from the claims, the following description of preferred embodiments, and on the basis of the drawings. Shown herein are:

DETAILED DESCRIPTION

Figure 1:
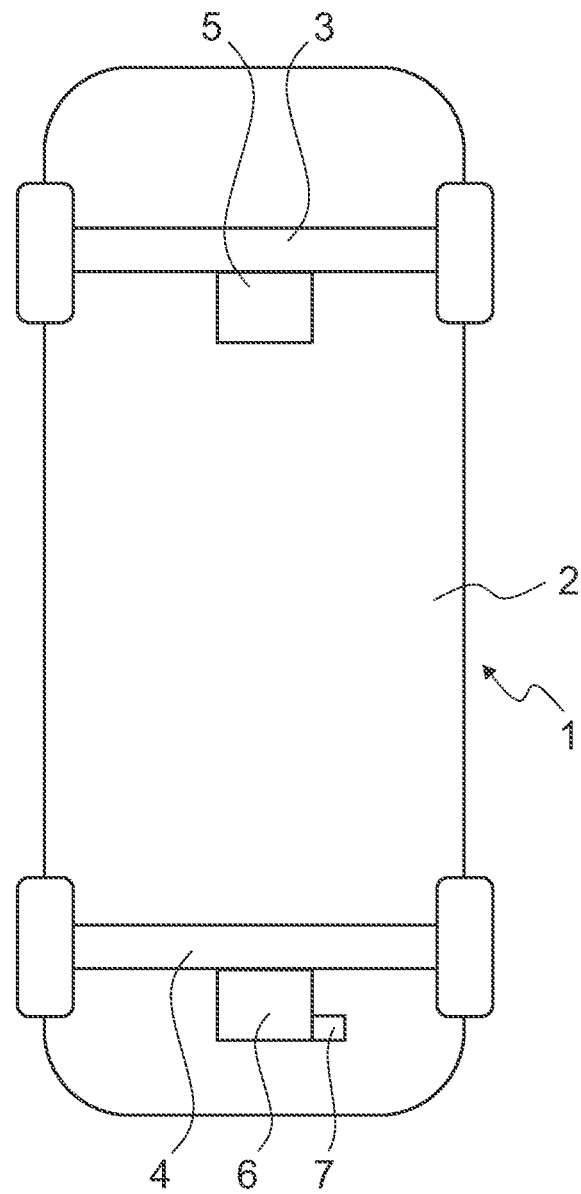
FIG. 1 a schematic top view onto a motor vehicle having a device for control of a rear-axle steering.

In very schematic fashion, FIG. 1 shows a motor vehicle 1, having, in a known way in and of itself, a bodywork 2, a front axle 3 and a rear axle 4. In the present case, both the front axle 3 and the rear axle 4 are steered axles. The nature and manner of steering the front axle 3 and the rear axle 4 shall not be described here in detail. However, respective steering systems are suggested, once more very schematically, which are associated with the front axle 3 and the rear axle 4, and with which the front axle 3 and the rear axle 4 are steered. The steering system of the front axle 3 is designated here the front-axle steering 5 and the steering system of the rear axle 4 is designated as the rear-axle steering 6. The front-axle steering 5 is fundamentally independent of the rear-axle steering 6, but certain dependencies may be produced, of course, but are of an electronic kind and not a mechanical kind.

The rear-axle steering 6 comprises a steering angle setting device 7, which basically serves for setting a desired steering angle of the wheels of the rear axle 4. The steering angle setting device 7 for this purpose at first receives the driver's wish, entered via a steering handle (not shown), and processes this into the respective steering angle of the rear axle 4 or the wheels of the rear axle 4.

Furthermore, however, the steering angle setting device 7 is also able to deviate from the driver's wish as entered by the steering handle for certain reasons to be described below. Thus, with the steering angle setting device 7, it is possible to limit the steering angle and/or the gradient of the steering angle of the wheels of the rear axle 4 upon reaching a predetermined lateral acceleration of the motor vehicle 1 as a function of a coefficient of friction of a roadway surface (not shown) on which the motor vehicle 1 is moving.

In a method for control of the rear-axle steering 6 of the motor vehicle 1, the steering angle is set for wheels of the rear axle 4. Upon reaching a predetermined lateral acceleration of the motor vehicle 1, the steering angle and/or the gradient of the steering angle of the wheels of the rear axle 4 is limited as a function of the coefficient of friction of the roadway surface. This method may be carried out by a device, not represented in its entirety, of which the steering angle setting device 7 is also a part, among others. Preferably, the steering angle and/or the gradient of the steering angle is limited in the case of falling below a given coefficient of friction of the roadway surface.

By the phrase "the steering angle and/or the gradient of the steering angle" is meant that either only the steering angle or only the gradient of the steering angle is limited or that both the steering angle and the gradient of the steering angle are limited. In this case, the latter is to be preferred.

Figure 2:
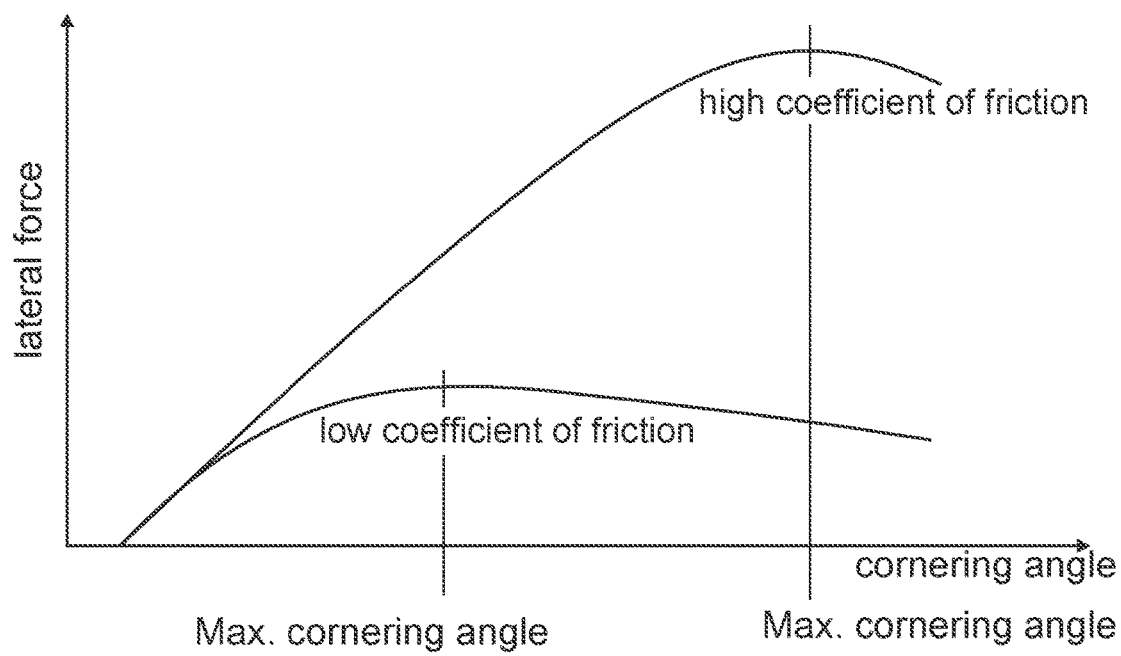
FIG. 2 a diagram in which the tire lateral force is plotted against the cornering angle.

FIG. 2 shows a characteristic field or a diagram in which the tire lateral force is plotted against the cornering angle. It will be noticed that, on a roadway surface having a low coefficient of friction, such as a snow-covered or ice-covered road, the maximum tire lateral force is reached at a significantly lower cornering angle than on a roadway surface having a high coefficient of friction. The maximum possible cornering angle is thus dependent on the coefficient of friction of the roadway surface.

The above-described method in which the steering angle and/or the gradient of the steering angle of the wheels of the rear axle 4 is limited, is implemented for the reasons explained in the following: when steering in the lateral dynamic limit range, the front axle 3 of the motor vehicle 1 is the first to reach the cornering angle with the maximum lateral force. An increasing of the steering angle, i.e., an oversteering, accordingly results in a decreasing of the lateral force of the front axle 3. However, at this time the cornering angle has not yet reached the maximum lateral force at the rear axle 4, so that a steering movement of the rear axle 4 in the same direction results in an increasing of the lateral force on the rear axle 4. In this way, the driving behavior will be strongly toward understeering and may in the extreme case result in straight motion and hence driving off the roadway. Similarly, an excessive steering movement of the rear-axle steering 6 in the opposite direction in the limit range results in a reduction of the lateral forces on the rear axle 4. The driving behavior in this way will be strongly toward oversteering, and in the extreme case may result in extreme oversteering of the motor vehicle 1 and loss of control.

Figure 3:
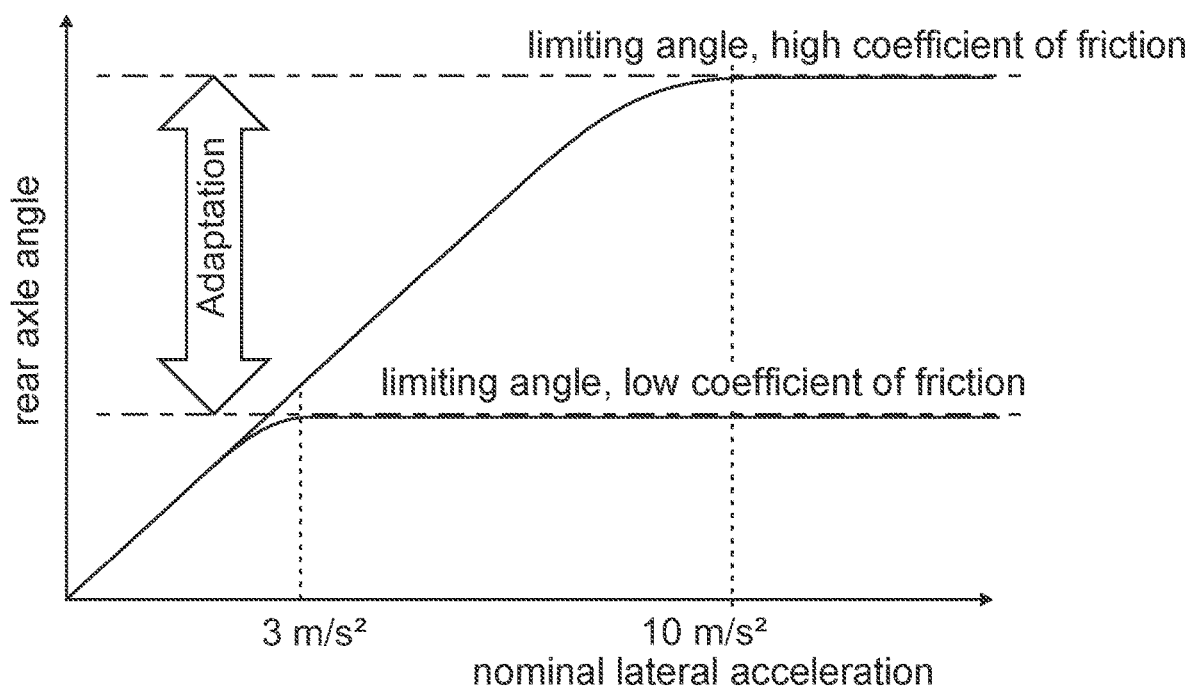
FIG. 3 a diagram in which the rear-axle steering angle is plotted against the nominal lateral acceleration.

FIG. 3 shows a diagram in which the rear-axle steering angle is plotted against the nominal lateral acceleration.

The limiting of the gradient of the steering angle of the wheels of the rear axle 4 or the gradient of the rear-axle steering angle can be determined as described below:

For the precise determining of the driving condition with maximum permissible cornering angle on any roadway surface, the coefficient of friction utilization is defined as follows:

$$\mu_{utilization} = \text{absolute}(ay_{nominal})/(\mu \cdot g).$$

The value range is limited to [0 1], g is the gravitation constant and μ is the estimated roadway coefficient of friction. The nominal lateral acceleration is obtained from the steering wheel angle sensor $\text{Delta}_{LWT}$ or the measured toothed rack position of the front-axle steering 5 $\text{Delta}_{EPS}$. An exemplary calculation for this might appear as follows:

$$ay_{nominal} = \text{Delta}_{LWT}/\text{mechanical steering ratio} \cdot \text{driving speed} \cdot \text{yaw gain}$$

or $$ay_{nominal} = \text{Delta}_{EPS} \cdot \text{driving speed} \cdot \text{yaw gain}$$

The yaw gain describes the relation between wheel steering angle and yaw rate of the motor vehicle 1.

The maximum gradient of the rear-axle steering movement $d\_\text{Delta}_{HA}$ depends on μutilization. For a coefficient of friction utilization of 1, the permitted gradient should drop to 0°/s in order to prevent a further steering movement. A continuous decline in the gradient, i.e., a constant differentiability, is advantageous in this case. This is illustrated in FIG. 3 by the rounded trend of the curve at the respective limit.

The limiting of the steering angle of the wheels of the rear axle 4 or of the absolute rear-axle steering angle can be determined as described below:

In the ideal case, the cornering angle maximum of the tires on the rear axle 4 will not be exceeded when driving with the maximum possible lateral acceleration on the particular roadway surface. Thus, the limiting maximum rear-axle steering angle corresponds to the rear-axle steering angle at the nominal lateral acceleration, reflecting the adhesion potential of the roadway surface.

The stationary rear-axle steering angle is obtained basically from the steering wheel angle sensor Delta m or the measured toothed rack position of the front-axle steering $\text{Delta}_{EPS}$. An exemplary calculation for this might look like the following:

$$\text{Delta}_{HA} = \text{Delta}_{EPS} * \text{steering ratio}_{HA}$$

or $$\text{Delta}_{HA} = \text{Delta}_{LWT}/\text{mechanical steering ratio} * \text{steering ratio}_{HA}$$

The steering ratio$_{HA}$ is an application value for the characteristic of the rear-axle steering 6.

The maximum lateral acceleration results from the coefficient of friction potential µ with the gravitation constant g as follows:

$$ay_{MAX} = \mu \cdot g$$

From the above-given equations, the maximum rear-axle steering angle can be calculated as follows:

$$\text{Delta}_{HA,MAX} = (\mu \cdot g \cdot \text{steering ratio}_{HA})/(\text{driving speed} \cdot \text{yaw gain})$$

It is obvious that in order to carry out the described method, the coefficient of friction µ of the roadway surface should be known at least approximately. In order to determine the same, one may rely on known techniques, such as, for example, an estimation on the basis of the deviation of the measured movement parameters, such as yaw rate and/or lateral acceleration, from the model-based nominal values, an estimation on the basis of wheel slip, an estimation from steering torques, information from a Car2X communication. The sensors already present on the motor vehicle 1 may be used for this.

All functions described herein may be adapted in their amplification, for example, by way of the driving speed, the steering wheel angle, the steering wheel speed, in critical driving situations such as oversteering and understeering, or as a function of the selected driving profile.

The invention claimed is:

1. A method for control of a rear-axle steering of a motor vehicle, having a rear axle and one or more sensors comprising:

determining, based on one or more sensors, an estimated coefficient of friction of a roadway surface;

receiving, via a steering angle setting device, a steering angle set command, and, based on the steering angle set command, setting a steering angle of wheels of the rear axle of the motor vehicle;

determining when the motor vehicle has reached a predetermined level of lateral acceleration, and, upon the motor vehicle reaching this predetermined level of lateral acceleration, limiting the steering angle and/or a gradient of the steering angle of the wheels of the rear axle as a function of the estimated coefficient of friction of a roadway surface on which the motor vehicle is moving, and is calculated according to the formula:

$$\text{Delta}_{HA,MAX} = (\mu \cdot g \cdot \text{steering ratio}_{HA})/(\text{driving speed} \cdot \text{yaw gain})$$

wherein $\text{Delta}_{HA,MAX}$ is a maximum rear-axle steering angle, µ is the estimated coefficient of friction of the roadway surface and yaw gain defines a relationship between the steering angle and a yaw rate of the motor vehicle.

2. The method as claimed in claim 1, wherein the steering angle of the wheels of the rear axle is set by means of a steering angle setting device.

3. The method as claimed in claim 2, wherein the gradient of the steering angle is continuously reduced.

* * * * *